United States Patent

Kankaanpää-Anttila et al.

[11] Patent Number: 5,925,401
[45] Date of Patent: Jul. 20, 1999

[54] FLAX PREPARATION, ITS USE AND PRODUCTION

[75] Inventors: Barbara Kankaanpää-Anttila; Markku Anttila, both of Härmä, Finland

[73] Assignee: Oy Jalo Ant-Wuorinen AB, Helsinki, Finland

[21] Appl. No.: 08/875,266

[22] PCT Filed: Jan. 19, 1996

[86] PCT No.: PCT/FI96/00042

§ 371 Date: Jul. 18, 1997

§ 102(e) Date: Jul. 18, 1997

[87] PCT Pub. No.: WO96/22027

PCT Pub. Date: Jul. 25, 1996

[30] Foreign Application Priority Data

Jan. 20, 1995 [FI] Finland .................................. 950266

[51] Int. Cl.⁶ ................................ A23J 1/00; A23L 1/10
[52] U.S. Cl. ..................... 426/656; 426/430; 426/443; 426/481; 426/482; 426/507
[58] Field of Search ................... 426/656, 430, 426/443, 481, 482, 507

[56] References Cited

U.S. PATENT DOCUMENTS

| | | | |
|---|---|---|---|
| 3,926,940 | 12/1975 | Circle et al. | 260/123.5 |
| 4,774,098 | 9/1988 | Gould et al. | 426/549 |
| 4,931,061 | 6/1990 | Young | 47/57.6 |
| 5,035,910 | 7/1991 | Jones et al. | 426/478 |
| 5,069,903 | 12/1991 | Stitt | 424/195.1 |
| 5,705,618 | 1/1998 | Westcott et al. | 530/500 |

OTHER PUBLICATIONS

Oomah, et al., "Flaxseed proteins—a review", Food Chemistry vol. 48 (1993) pp. 109–114.
Dev, et al., "Preparation and Functional Properties of Linseed Protein Products Containing Differing Levels of Mucilage", Journal of Food Science vol. 53, No. 6 (1988) pp. 1834–1837.
Bertoni, et al., "Isolation of Completely powdery proteins from linseed", Chemical Abstracts vol. 78, No. 5 (Feb. 5, 1973) p. 380.
Zagibalov, et al., "Use of a protein isolate for linseed meal in bakery products", Feed Chem. vol. 115, No. 1 (Jul. 8, 1991) p. 727.
Mazza, et al., "Functional properties of flax seed mucilage," Journal of Food Science (1989).

*Primary Examiner*—Nina Bhat
*Attorney, Agent, or Firm*—Birch, Stewart, Kolasch & Birch, LLP

[57] ABSTRACT

The invention relates to a process for producing a product containing flax proteins and flax mucilage, in which process linseeds are cold and/or hot pressed and, if desired, further extracted with a suitable solvent for separating the linseed oil, the resulting pressed and crushed flax is alkali extracted and the insoluble fibre is separated, the alkaline extract is precipitated with an acid and a lower alkanol for producing a precipitate containing proteins and mucilage, the lower alkanol is separated from the precipitate and the resulting preparation is used as such or it is dried and possibly mixed with suitable adjuvants. The invention also relates to a flax protein product containing flax mucilage and its use in food processing, especially in baking.

14 Claims, 1 Drawing Sheet

U.S. Patent     Jul. 20, 1999     5,925,401
BLOCK DIAGRAM OF THE FLAX PROCESS         FIG. 1
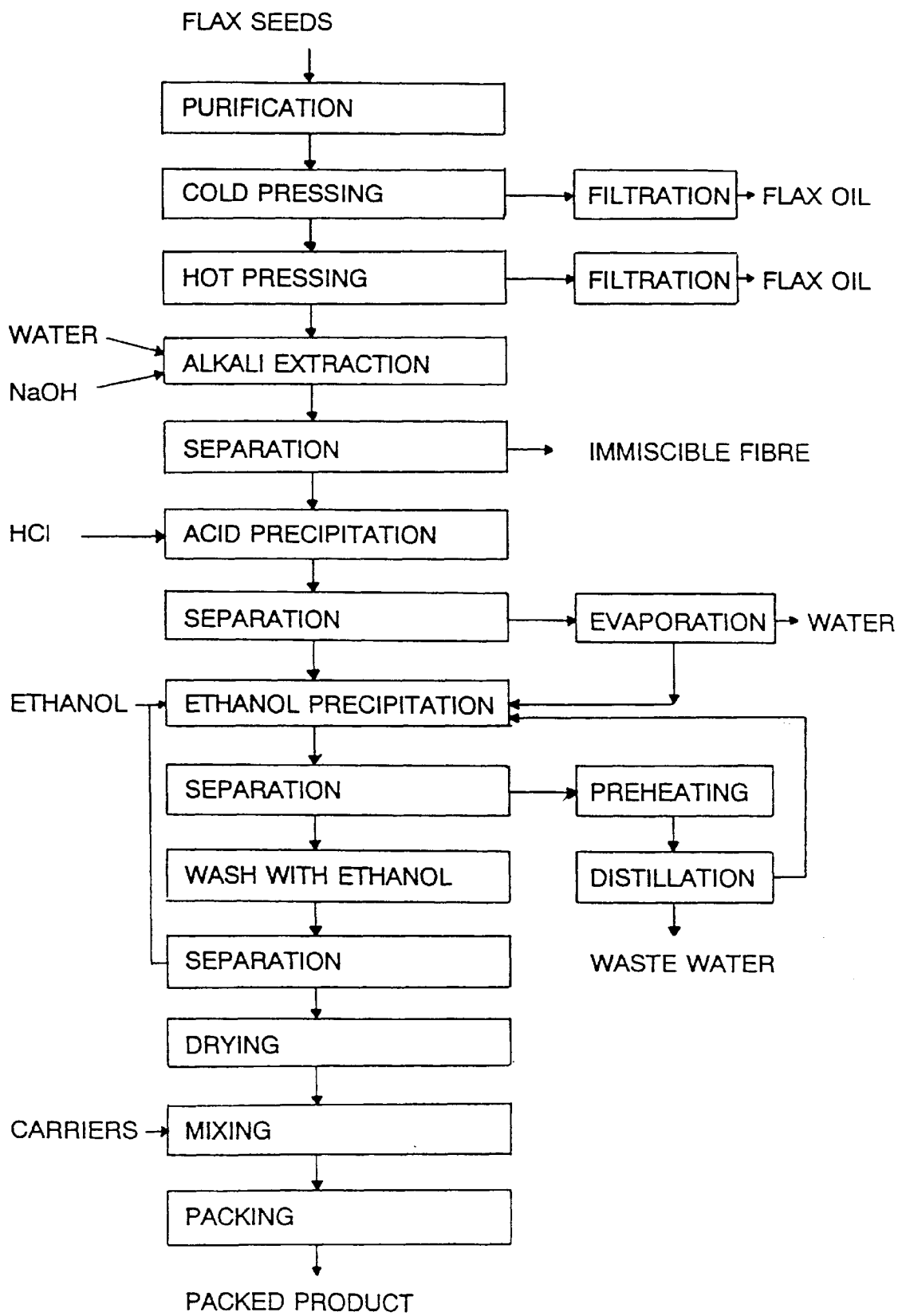

FLAX PREPARATION, ITS USE AND PRODUCTION

This application is a 371 of PCT/FI96/00042 filed Jan. 19, 1996.

FIELD OF THE INVENTION

This invention relates to a flax protein preparation having a high mucilage content, a process for its production and its use in food preparation, especially in baking.

BRIEF DESCRIPTION OF THE DRAWING

FIG. 1 is a block diagram of the flax process.

BACKGROUND OF THE INVENTION

Flax (Linum usitatissimum L.) is generally cultivated for flax fibre or oil recoverable from linseeds. For these uses, flax has been cultivated into oil flax and fibre flax, but there also exist varieties which are suitable for both purposes. Linseed oil is primarily used in different kind of paints, putties, coatings and wood protecting agents. The oil content of linseeds is, calculated from the dry weight, generally over 38% by weight, most of which can be recovered by pressing and, if desirable, also by using additionally solution extraction. However, in the pressed and crushed flax obtained from cold and/or hot pressing still some linseed oil remains, which constitutes about 8 to 18% of the composition of the crushed flax. Furthermore, the crushed flax obtained from pressing contains inter alia about 30 to 35% of protein and 25 to 30% of food fibre, of which about a third is water-soluble mucilage, which practically consists of polysaccharides. However, the contents of oil, protein and polysaccharide in flax vary significantly every crop year.

Pressed and crushed flax has so far been used mainly as a fodder for animals, especially for ruminants, due to its relatively high protein content and favourable digestability. It has generally been considered unsuitable for food applications, partly due to cyanogen glycosides contained in the flax (Oomah & Mazza, Food Chemistry 48 (1993) 109–114). Recently, however, the interest in flax proteins has increased because their functional properties, such as water binding, oil absorption and emulsifying activity are comparable to soy proteins widely used nowadays. Attempts have been made at separating flax proteins from oilfree flax flour, for instance by salt extraction and dialysis, or by alkaline extraction and acid precipitation. However, there does not yet exist any economically feasible process for the separation of linseed proteins (Oomah & Mazza, supra). Partly this is due to the mucilage content of the linseed hull which is higher than in other oil plants and which makes the separation of the protein more difficult.

The mucilage of the pressed and crushed flax has been studied and attempts have been directed at the separation and removal thereof in order to facilitate the separation of proteins. Mucilage consists of soluble carbohydrates, inter alia of water-soluble polysaccharides. The properties of flax mucilage has been found to resemble those of arabic gum, but mucilage is not, however, generally used as a stabilizing or thickening agent, apparently because there has not been enough reliable information about its functional properties (Mazza and Biliaderis, J. Food Sci. 54 (1989) 1302–1305). The lack of an economically feasible separation technology has also been an obstacle for the large-scale use of mucilage. However, it has been found that flax mucilage has a high water binding capacity, even 1600 to 3000 g of water per 100 g of dry matter (Fedeniuk and Biliaderis, J. Agric. Food Chem. 42 (1994) 240–247).

In the preparation of flax protein products mucilage has thus hitherto been considered a component which disturbs the separation of the proteins and which has been the object of removal attempts. In the only one prior art process of which the applicants are aware of, in which the mucilage was not separated before the precipitation of the proteins (Dev and Quensel, J. Food Sci. 53 (1988) 1834–1837) the fat was removed from the pressed flax cake by extraction with isopropanol, proteins and mucilage were then extracted with a base and the resulting solution was precipitated with an acid. Thus a protein content of 63 to 65% of dry matter was obtained for the preparations which had the highest mucilage content, and the content of pentosans, the amount of which reflects the amount of polysaccharides in food fibre, was only 8 to 9%. This indicates that nowhere near all of the polysaccharides were precipitated by the method. However, mucilage was found to have an advantageous effect on the water binding and emulsifying properties of the resulting preparation. The preparation was tested in fish sauce, meat emulsion and ice cream (Dev and Quensel, J. Food Sci. 54 (1989) 183–186). For instance, in fish sauce large quantities of the preparation had to be used in order to stabilize the product. The preparation was not at all suitable for a meat emulsion due to its insufficient gelling properties. Neither was the viscosity produced by the preparation in ice cream the same as that produced by gelatin, which is normally used in ice cream. Thus it seems that, according to the process of the prior art, a polysaccharide content high enough is not achieved in a flax protein—mucilage preparation.

The afore mentioned prior art process for preparing a product containing flax proteins and flax mucilage involves further disadvantages. Therefore, because the pentosan content of the total amount of proteins and pentosans is even at its highest only about 11 to 12%, a large quantity of dissolved mucilage remains in the solution after acid precipitation, which, as is well known, binds a large quantity of water. Therefore, in industrial scale production, solutions are difficult to process further, and, for instance, only expensive freeze-drying is suitable as a drying method.

The object of the present invention is to eliminate the disadvantages of the prior art and to provide a novel process for the production of a completely novel type of a flax protein product, and to use the resulting preparation in food processing, especially in baking. Thus, according to the invention it has now been discovered that by precipitating the flax proteins and flax mucilage from the alkaline extract with an acid and a lower alkanol, a product having a significantly higher mucilage content is obtained and problems caused by unprecipitated mucilage in the further processing are avoided. The resulting preparation is excellently suitable as an adjuvant in food processing, especially in baking, in place of the usual improver additives for bread, due to the below-mentioned advantageous effects thereof on improving the properties when used in baking.

Thus the invention relates to a process for the preparation of a product containing flax proteins and flax mucilage, in which process linseeds are cold and/or hot pressed and, if desirable, also extracted with a suitable solvent for the separation of linseed oil, the resulting pressed and crushed flax is alkali extracted and the insoluble fibre is separated, the alkaline extract is precipitated with an acid and a lower alkanol for the production of a precipitate containing proteins and mucilage, the lower alkanol is separated from the precipitate, the precipitate is, if necessary, purified and the resulting product is used as such or it is dried and possibly mixed with suitable adjuvants.

The invention also relates to a flax protein product having a high mucilage content, which may be produced by the above-mentioned process, and the use of the said preparation as an adjuvant in foods, especially in baked products.

According to the process, the seeds of oil flax or fibre flax used as a starting material are cleaned and hot and/or cold pressed as previously known for the separation of the linseed oil. The linseed oil recovered from cold pressing is usually about 20% of the weight of the seeds. If the warm, crushed flax obtained from cold pressing is repressed (by hot pressing), the linseed oil recovered is generally almost 10% of the weight of the seeds. The crushed flax from compression may, if necessary, be ground to a smaller particle size. Further, if desired, residual oil may be removed therefrom by extracting with a suitable solvent, such as, for instance hexane or isopropanol.

The crushed flax which results from pressing and possible solvent extraction, and from which a major part of the oil has been removed, is alkali extracted in a known manner for dissolving proteins and mucilage. Before the addition of the alkaline solution, a suitable amount of water, preferably hot water, the temperature of which is for instance about 60 to 65° C., is added to the crushed flax in an amount of for instance about 15 to 20-fold compared to crushed flax. For the extraction, a suitable alkaline agent is used, such as, for instance sodium or potassium hydroxide or other alkaline agents generally used in the food processing industry, preferably dilute sodium hydroxide, in an amount sufficient for raising the pH of the mixture to the range of about 8 to 12, preferably to the range of about 9 to 10. After the addition of the alkaline solution, the suspension is stirred for at least half an hour to allow the pH of the mixture to stabilize. The temperature used is preferably over 50° C., especially 60 to 65° C., which is achieved by adding sufficiently hot water to the crushed flax, and the suspension is mixed for a period of from half an hour to several hours. Thus by means of the alkali extraction, about 60 to 80% of the proteins and 50 to 70% of the pentosans (polysaccharides) can be made to dissolve.

The insoluble fibre is separated from the alkaline extract for instance by centrifugation or by filtration. The resulting filtrate may, if desired and if necessary, be concentrated by evaporation. After neutralizing, the concentrated alkaline extract filtrate might in principle be used as such as an adjuvant in baking, but because the filtrate in practice can be evaporated to a dry matter content of only at the most 15% due to gelatinizing, industrial production and use are not possible. Thus in the process according to the invention the filtrate is further processed by precipitating with an acid and a lower alkanol, especially with ethanol, as described later.

In the acid precipitation, acid is added to the alkaline extraction filtrate in order to lower the pH to the isoelectric point of the flax proteins, i.e. to the range of about 3 to 5, preferably about 4 to 4.5. Suitable acids include conventional inorganic and organic acids used in food industry, such as dilute hydrochloric, sulphuric, nitric, phosphoric and acetic acid, especially dilute hydrochloric acid.

In the acid precipitation the proteins form precipitating macromolecules at the isoelectric point of the proteins. About 60 to 80% of the amount of the proteins dissolved in the alkaline extraction are precipitated, and as a part of the proteins also carbohydrates are precipitated, of which determinable pentosans constitute at the most about 10 to 15% of the amount of the precipitated protein. The above mentioned amount of pentosans is precipitated when the crushed flax used is almost defatted, in other words, when it is solvent extracted after pressing. The usual cold and/or hot pressed flax contains 8 to 18% of residual oil, in which case the proteins are primarily accompanied by the oil in the acid precipitation, and the polysaccharides are hardly being precipitated at all.

Thus according to the invention also a lower alkanol is added to the mixture in such a way that the alcohol concentration of the solution will be about 50 to 75% (for instance about 1 to 3-fold amount of a concentrated, food-grade ethanol solution in comparison with the amount of solution to be precipitated). Suitable lower alkanols include, for instance, methanol, ethanol and isopropanol, especially ethanol. The alcohol can be added either directly to the mixture, to which the acid has first been added, or the acid precipitated mixture can first be separated into a precipitate fraction and a filtrate fraction, whereby the alcohol is added primarily to the filtrate. The alcohol can also be added simultaneously with the acid, or the alcohol precipitation can be performed wholly before the acid precipitation. The solution to be precipitated can be heated, because especially the ethanol precipitation is advantageously performed at a temperature slightly higher than room temperature. The precipitation takes place relatively rapidly when the solution to be precipitated is stirred at the same time the acid and/or the alcohol are added to allow the mixture to stabilize.

If the acid precipitation and separation, for instance by centrifugation, are performed first, the resulting filtrate fraction may, if desired, be evaporated to a higher solid content before the addition of the alcohol. Also the mucilage of the precipitate obtained from the centrifugation may be precipitated by extracting with, for instance, a 1 to 3-fold amount of concentrated ethanol, either combined with the filtrate fraction or separately.

The order in which acid and alcohol are added and the separation stage of the precipitate depend on the equipment available and are consequently to be chosen by the person skilled in the art. Thus 60 to 90% of the dissolved pentosans are recovered, which is significantly more than in the flax protein—mucilage precipitate produced according to the process of the state of the art. Further, by precipitating the mucilage with an alcohol the viscosity of the solution can be reduced significantly, which facilitates the separation of the precipitate consisting of proteins and mucilage.

The resulting flax protein—mucilage precipitate is recovered for instance by filtration or by centrifugation and it is washed, if desirable, with an alcohol. Washing with an alcohol solubilizes a major part of the oil which from the pressing stage remains in the crushed flax, if solvent extraction is not used, and which also contains flax cyanogen glycosides. If it is desirable to adjust the pH value of the resulting product, this can advantageously be performed at this stage of the process. Without adjustment, the pH value is mildly acidic after washing with the alcohol and thus does not necessarily need to be adjusted. The alcohol used for washing can be recovered and used in the alcohol precipitation. The alcohol used in the alcohol precipitation can be distilled and reused.

The resulting flax protein product having a high content of flax mucilage may be used as such or it may be dried to a powder, which may be further mixed with suitable carriers and adjuvants. Suitable carriers and adjuvants for use in baking include, for instance, wheat flour, sugars, corn malt, ascorbic acid, amylase and lecithin, which are added in suitable amounts in such a way that the content of the mucilage containing flax product in the end product, for instance in an improver additive for bread, is 10 to 100%, preferably 20 to 50%. As a drying method, for instance air drying or freeze-drying may be used. An especially suitable and economical drying method is air drying. If the separated solid matter is freeze-dried after the alcohol precipitation, washing of the solid matter with an alcohol may be omitted.

One preferred embodiment according to the process of the invention has been presented in a block diagram in FIG. 1. According to the process of the FIG. 1, the acid precipitation is performed before the alcohol precipitation, both the filtrate fraction and the precipitate fraction from the acid precipitation are precipitated by ethanol, the resulting precipitate is washed with ethanol, dried and mixed with carriers.

According to the process of the invention, a flax protein product having a very high mucilage content can be produced. The mucilage content of the flax protein product is 20 to 45%, especially 30 to 40%, which amount comprises i.a. the water-soluble pentosans (pentosans constitute 10 to 20% of the whole composition of the product), and the protein content 35 to 60%, especially 40 to 50% of the dry matter, the rest being insoluble polysaccharides and moisture. The proportion of the pentosans of the total amount of proteins and pentosans is on the average about 16 to 33%, normally 18 to 25%. Thus the product differs significantly from the previously known flax mucilage preparations by its mucilage content, which is represented by the amount of pentosans in the product.

Regarding the use in food products of substances produced from flax it can generally be stated, that the subject has not been studied very much. Flax is known to have been tested in baking only as ground or whole linseeds or as a pressed cake. Thus it is surprising that the novel flax protein—mucilage preparation produced according to the process of the invention is excellently suitable especially for baking purposes, where it may be used in place of traditional improver additives for bread. The suitability of the preparation as an improver additive for bread is due i.a. to the excellent emulsifying and water binding capacity and viscosity and foaming properties, all of which are related to the high mucilage content of the product. In addition, comparative experiments show that the flax protein—mucilage preparation according to the invention has an advantageous effect not only on the structural properties of the dough but also on the rising stability and on the shelf life of the bread.

Thus by using the flax product according to the invention in baking it has been discovered that the following advantages are achieved:
the dough hardness is improved mainly due to the proteinous parts of the product,
the effect of the mucilage improves the restoration ability of the structure of the finished baked product,
the gas retaining capacity of the dough is improved,
the dough tolerates processing (machine processing) better,
time delays may be allowed for in the preparation (the dough tolerates for instance over-rising),
the baked products tolerate freezing before baking,
homogeneous baked products are obtained (with an even pore structure),
the volume of the bread improves,
when the dough binds more water, the baking loss is decreased and the shelf life is improved (the product maintains its freshness longer),
the salt content may be decreased due to improved water binding capacity.

Traditionally used improver additives for bread may consequently be replaced in baking by the flax protein preparation having a high mucilage content according to the invention. The flax preparation does not generate any side tastes in the bread, either. The flax preparation may be used in the dough for instance in the amount of 0 to 10%, preferably 0.3 to 5% of the amount of flour used.

The invention is described more closely in the following by the way of examples, which are only intended to illustrate the invention but not to restrict it.

EXAMPLE 1

Production of the Flax Product

Dried seeds of oil or fiber flax (moisture 6 to 8%) were cleaned by grading and dust removal. The cleaned seeds were first cold pressed, whereby 20% of flax oil calculated from the weight of the seeds was obtained. The warm crushed flax obtained from pressing was repressed. From this hot pressing, almost 10% of flax oil calculated from the weight of the seeds was obtained. If necessary, the crushed flax was ground to a smaller particle size.

The resulting pressed flax contained 7.9% pentosans and 34.3% proteins. To the pressed flax, a 15 to 20-fold amount of hot, 60 to 65°C. water was added. The pH of the solution was adjusted to the range of 9.5 to 10.0 with a dilute NaOH solution. The suspension was stirred at least for a half an hour. Insoluble fiber was separated in a continuous disc centrifuge. If necessary, the yield of the filtrate from centrifugation was improved by recycling the sediment fraction back to the alkaline suspension. Thus 60% of the pentosans and about 66% of the proteins were made soluble.

The pH of the filtrate fraction from the centrifugation, which was, if necessary, concentrated, was adjusted to the isoelectric point (pH 4.2 to 4.5) of proteins with dilute hydrochloric acid. The precipitated fine precipitate was separated in a continuous disc centrifuge.

After precipitation the filtrate fraction from centrifugation was evaporated to a dry matter content of at least 10%. The pentosans present in the filtrate fraction were precipitated with a 1 to 3-fold amount of ethanol solution, whereby the ethanol concentration of the solution to be precipitated was 50 to 75%. If necessary, the solution was heated. Also the pentosans of the sediment fraction from centrifugation were precipitated by extracting with a 1 to 3-fold amount of ethanol, either combined with the filtrate fraction, or separately.

After the ethanol precipitation, the solid matter was separated from the filtrate by filtration or by centrifugation. The solid matter was washed with ethanol, at which time most of the remaining oil from pressing was made to dissolve. The washing solution was separated from the solid matter. The washed dry matter was dried by air drying.

80% of the pentosans and almost 70% of the proteins were precipitated, calculated from the dissolved amount. The mucilage content of the resulting flax protein product was 36% (the pentosan content about 11%) and the protein content 45% of the dry matter. To the product dried for baking purposes, wheat flour and sugars were added in such a way that the content of the flax product in the final product was 30%.

EXAMPLE 2

Use of the Flax Product in Baking (Freeze Baking)

In the baking of plain bread 0.6 to 0.8% of the flax product according to the example 1 (1.5 to 2.0% of the adjuvants containing product) calculated from the amount of flours used, was added during the preparation of the dough. The use of this concentration ensured that the dough endured freezing before baking.

The dough was prepared and baked in the normal way and freezed before made to rise. After thawing, the products were made to rise. If desired, also the already risen products could have been frozen.

The structure of the resulting bread was homogeneous also after freeze-baking, and the restoration ability of the structure was good. Also the gas retaining capacity of the bread remained good. The use of the flax product did not cause any defective flavour to the bread, either. Furthermore, the baking loss was only 12%, while it with traditional improver additives for bread (for instance Primat, manufactured by Ireks, Germany) is 15 to 17%.

EXAMPLE 3

Use of the Flax Product in Baking (Direct Baking)

Half of the amount of the flax product used in the example 2 (0.3 to 0.8% of flax product calculated from the amount of flours) was used and the dough was baked directly without freezing. The baking characteristics of the dough were better than in dough produced with traditional improver agents. Also the other properties were analogous to the properties of the bread produced according to the example 2.

EXAMPLE 4

Use of the Flax Product in Baking

The amount of the flax product used was greater than in the previous examples, in other words even up to 2 to 5% from the amount of flours used. Thus the water binding capacity was improved and thereby the baking loss was decreased. At the same time, both the baking and gas retaining properties of dough were improved significantly.

We claim:

1. A flax protein product containing flax mucilage, wherein the flax protein is obtained by
    cold and/or hot pressing linseeds and optionally further extracting with a suitable solvent for separating the linseed oil,
    alkali extracting the resulting pressed and crushed flax and separating the insoluble fibre,
    precipitating the alkaline extract with an acid and a lower alkanol in such a way that the alcohol concentration of the mixture to be precipitated will be about 50 to 75%,
    separating the lower alkanol from the precipitate containing proteins and mucilage, and
    optionally drying the precipitate and optionally mixing the precipitate with suitable adjuvants.

2. A flax protein product comprising mucilage, wherein said product contains 10 to 20% pentosans and 35 to 60% flax proteins.

3. The flax protein product containing mucilage of claim 2, wherein said product contains 40 to 50% flax proteins.

4. An improver additive for bread comprising 10 to 100% of the flax protein product containing mucilage of claim 2 and adjuvants.

5. The improver additive for bread of claim 4, wherein said improver additive contains 20 to 50% of said flax protein containing mucilage.

6. A process for producing a product containing flax proteins and flax mucilage, in which process linseeds are cold and/or hot pressed and optionally extracted with a suitable solvent for the separation of linseed oil, the resulting pressed and crushed flax is alkali extracted and the insoluble fibre is separated, comprising the steps of:
    precipitating the alkaline extract with an acid and a lower alkanol in an acid precipitation step in such a way that the alcohol concentration of the mixture to be precipitated will be about 50 to 75% for the production of a precipitate containing proteins and mucilage; and
    separating the lower alkanol from the precipitate;
    wherein the resulting preparation is optionally dried and optionally mixed with suitable adjuvants.

7. The process of claim 6, wherein the acid is added first to the alkaline extract and thereafter the lower alkanol is added, or the acid and the lower alkanol are added simultaneously, whereafter the resulting co-precipitate is recovered.

8. The process of claim 6, wherein the alkaline extract is acid precipitated, the acid precipitated mixture is separated into a precipitate fraction and a filtrate fraction, the filtrate fraction, and optionally the precipitate, is precipitated with a lower alkanol, and the resulting precipitates are recovered.

9. The process according to any one of claims 6 to 8, wherein the lower alkanol is added in such a way that the alcohol concentration of the mixture to be precipitated will be about 50 to 75%.

10. The process according to claim 6, wherein said acid precipitation step takes place at pH of about 3 to 5.

11. The process according to claim 6, wherein the resulting flax protein product containing flax mucilage is dried and mixed with adjuvants in such a way that the flax protein product containing mucilage constitutes 10 to 100% of the composition of an end product.

12. The process according to claim 11, wherein said adjuvant is selected from the group consisting of at least one of wheat flour, sugars, corn malt, ascorbic acid, amylase and lecithin.

13. The process according to claim 11, wherein said mucilage constitutes 20 to 50% of the composition of the end product.

14. The process according to claim 6, wherein said acid precipitation step takes place at a pH of about 4 to 4.5.

* * * * *